(12) United States Patent
Dutta et al.

(10) Patent No.: US 7,122,952 B2
(45) Date of Patent: *Oct. 17, 2006

(54) UV-EMITTING PHOSPHOR BLEND AND TANNING LAMP CONTAINING SAME

(75) Inventors: Arunava Dutta, Winchester, MA (US); Aline Tetreault, Drummondville (CA); Leonard V. Dullea, Peabody, MA (US); Pascal Horion, St. Nicephore (CA)

(73) Assignee: Osram Sylvania Inc., Danvers, MA (US)

( * ) Notice: Subject to any disclaimer, the term of this patent is extended or adjusted under 35 U.S.C. 154(b) by 298 days.

This patent is subject to a terminal disclaimer.

(21) Appl. No.: 10/760,787

(22) Filed: Jan. 20, 2004

(65) Prior Publication Data

US 2004/0155570 A1 Aug. 12, 2004

Related U.S. Application Data

(63) Continuation-in-part of application No. 10/348,468, filed on Jan. 21, 2003, now Pat. No. 6,984,931.

(51) Int. Cl.
*C09K 11/00* (2006.01)
*H01J 61/42* (2006.01)

(52) U.S. Cl. ............................ 313/487; 313/486
(58) Field of Classification Search ........ 313/486–487, 313/488; 252/301.4 R, 301.4 P
See application file for complete search history.

(56) References Cited

U.S. PATENT DOCUMENTS

| | | | |
|---|---|---|---|
| 3,821,578 A | 6/1974 | Beck et al. | 313/44 |
| 4,499,403 A | 2/1985 | Leppelmeier et al. | 313/487 |
| 4,645,969 A | 2/1987 | Hoffman | 313/487 |
| 4,843,279 A * | 6/1989 | Rattray et al. | 313/487 |
| 4,859,903 A | 8/1989 | Minematu et al. | 313/487 |
| 4,967,090 A | 10/1990 | Schlitt | 250/504 R |
| 6,208,069 B1 * | 3/2001 | Justel et al. | 313/487 |
| 2002/0050780 A1 | 5/2002 | Juestel et al. | 313/486 |
| 2004/0095059 A1 | 5/2004 | Laudano et al. | 313/485 |

FOREIGN PATENT DOCUMENTS

| | | |
|---|---|---|
| EP | 228737 | 7/1987 |
| EP | 0 806 792 A2 | 11/1997 |
| EP | 1 160 830 A2 | 12/2001 |

* cited by examiner

*Primary Examiner*—Karabi Guharay
(74) *Attorney, Agent, or Firm*—Robert F. Clark (57) ABSTRACT

A UV-emitting phosphor blend is provided which comprises a mixture of at least two UVA-emitting phosphors selected from $SrB_4O_7$:Eu, $YPO_4$:Ce, and $BaSi_2O_5$:Pb wherein the sum of the weight percentages of the phosphors in the mixture equals 100%. The phosphor blend may additionally contain an amount of a UVB-emitting phosphor in an amount from 0 to 12 wt. % of the mixture. Tanning lamps containing these blends exhibit increases in initial UVA output and UVA maintenance.

26 Claims, 7 Drawing Sheets

UV-EMITTING PHOSPHOR BLEND AND TANNING LAMP CONTAINING SAME

CROSS REFERENCES TO RELATED APPLICATIONS

This application is a continuation-in-part of application Ser. No. 10/348,468, filed Jan. 21, 2003, now U.S. Pat. No. 6,984,931.

TECHNICAL FIELD

This invention relates to ultraviolet-emitting phosphors and phosphor blends. More, particularly this invention relates to the UVA output and maintenance of tanning lamps.

BACKGROUND OF THE INVENTION

Tanning lamps are similar to conventional mercury-vapor fluorescent lamps in construction except that they contain one or more phosphors which emit radiation in the ultraviolet (UV) region of the electromagnetic spectrum in order to induce a tanning response in human skin. The UV emission from tanning lamps is classified into two regions, UVA and UVB. The U.S. Food & Drug Administration (FDA) defines the UVA region as being from 320–400 nm and the UVB region as being from 260–320 nm. (See, *Performance Standards for Light-Emitting Products: Sunlamp Products and Ultraviolet Lamps intended for use in Sunlamp Products*, 21 C.F.R. 1040.20) The majority of the UV flux of tanning lamps is emitted in the UVA region with the balance in the UVB region. This is intended to generally mimic the relative proportions of UVA and UVB in natural sunlight. Both UVA and UVB have a role in the tanning process. When human skin is exposed to UV light, the melanocytes in the skin's epidermis release extra melanin, a protein pigment responsible for tanning. While UVB radiation is more efficient than UVA in stimulating the production of melanin, UVA radiation is much more efficient than UVB in oxidizing the melanin to produce the brown color which is characteristic of suntans.

The typical UV-emitting phosphor employed in tanning lamps is a single-component lead-activated barium disilicate, $BaSi_2O_5$:Pb. The $BaSi_2O_5$:Pb phosphor intrinsically has low maintenance due to its affinity for mercury. Hence, when this phosphor is used in a mercury-vapor fluorescent lamp, the phosphor surface is usually protected by a coating, typically aluminum oxide, as described in U.S. Pat. Nos. 4,585,673, 4,710,674, 4,825,124 and 5,523,018. The alumina coating provides a barrier layer between the phosphor and the mercury-vapor and improves long term-UV maintenance.

Figure 1:
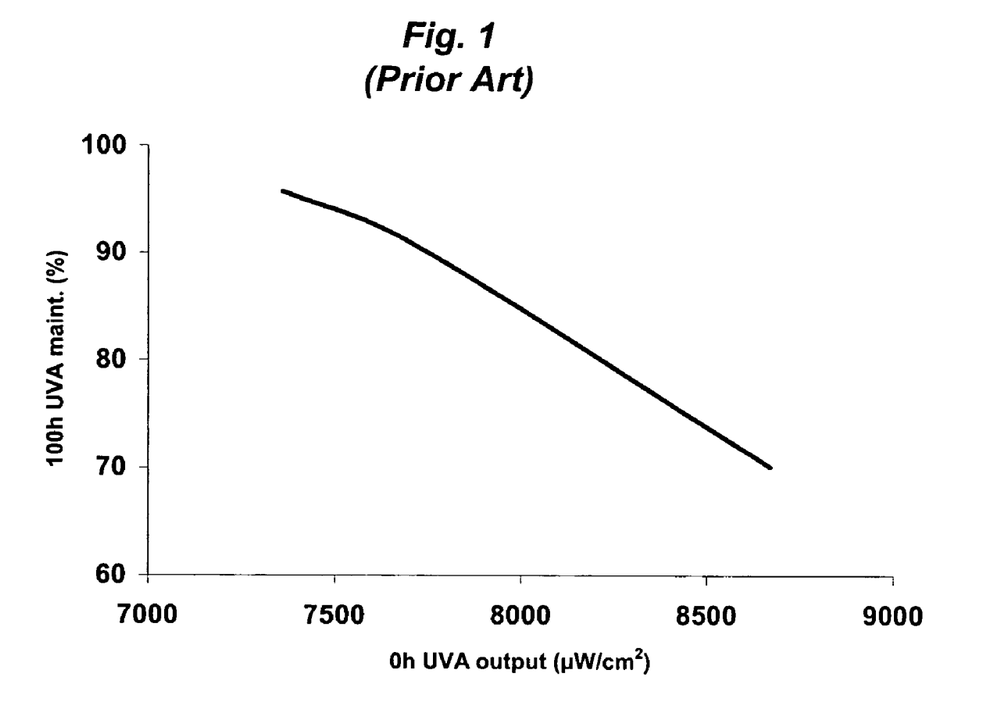
FIG. 1 is a graph of the relationship between the 0 h UVA output and the 100 h UVA maintenance of commercial reflector tanning lamps.

Reflector tanning lamps (RTLs) are a special class of tanning lamps wherein the UV flux is focused by a reflector which causes the flux to be emitted over a narrower segment of the circumference, for example 140°, instead of through the entire 360° circumference of the lamp. Two key performance parameters of tanning lamps, and RTLs in particular, are the initial UVA output of the lamp and the UVA maintenance. The initial UVA output of the lamp (0 hours) will be herein referred to as the 0 h UVA output. The UVA maintenance measures the ability of the lamp to maintain its initial UVA output over a period of time, usually the first 100 hours of operation, and is expressed as a percentage of the initial output. As used herein, the 100 h UVA maintenance is defined as the ratio of the UVA output of the lamp after 100 hours of operation to its initial UVA output times 100% ((100 h UVA output/0 UVA output)×100%). For commercial applications, it is very desirable to have both a high 0 h UVA output and a high 100 h UVA maintenance. Unfortunately, current commercial RTLs either have a high 0 h UVA output ($\geq 8600$ $\mu W/cm^2$) or a high 100 h UVA maintenance ($\geq 87\%$) but not both attributes simultaneously. In other words, RTLs that have a high 100 h UVA maintenance ($\geq 87\%$) have a 0 h UVA output that is much less than 8600 $\mu W/cm^2$. Conversely, RTLs that have a high UVA output ($\geq 8600$ $\mu W/cm^2$) have a 100 h UVA maintenance that is much less than 87%. The inverse relationship between 0 h UVA output and 100 h UVA maintenance for commercial reflector tanning lamps is shown in FIG. 1.

Therefore, it would be an advantage over the present state of the art to have tanning lamps, and RTLs in particular, that exhibit higher 0 h UVA outputs at high 100 h UVA maintenances.

SUMMARY OF THE INVENTION

It is an object of the invention to obviate the disadvantages of the prior art.

It is another object of the invention to provide tanning lamps having higher 0 h UVA outputs at high 100 h UVA maintenances.

In accordance with one aspect of the invention, there is provided a UV-emitting phosphor blend which comprises a mixture of at least two UVA-emitting phosphors selected from $SrB_4O_7$:Eu, $YPO_4$:Ce, and $BaSi_2O_5$:Pb, wherein the sum of the weight percentages of the phosphors in the mixture equals 100%. The phosphor blend additionally contains an optional amount of a UVB-emitting phosphor having a range from 0 to 12 wt. % of the mixture.

In accordance with another aspect of the invention, there is provided a fluorescent tanning lamp having a UV-transmissive envelope and a phosphor coating on an inner wall of the envelope. The phosphor coating contains a UV-emitting phosphor blend comprising a mixture of at least two UVA-emitting phosphors selected from $SrB_4O_7$:Eu, $YPO_4$:Ce, and $BaSi_2O_5$:Pb. The phosphor blend additionally contains an optional amount of a UVB-emitting phosphor having a range from 0 to 12 wt. % of the mixture.

In accordance with a further aspect of the invention, there is provided a fluorescent tanning lamp having a tubular UV-transmissive envelope, a reflector layer, and a UV-emitting phosphor layer. The reflector layer extends over a 220° segment of the circumference of the envelope and is disposed between the envelope and the phosphor layer. The phosphor layer extends over the entire circumference of the envelope and the lamp exhibits a 0 h UVA output of at least about 8800 $\mu W/cm^2$ and a 100 h UVA maintenance of at least about 87%.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

We have discovered that it is possible to simultaneously achieve a high 0 h UVA output at a high 100 h UVA maintenance by using a blend containing a mixture of at least two UV-emitting phosphors selected from the group comprising $SrB_4O_7$:Eu, $YPO_4$:Ce, and $BaSi_2O_5$:Pb. All three phosphors in the group emit radiation in the UVA region. The first phosphor, $SrB_4O_7$:Eu, exhibits an emission spectrum which peaks at 368 nm. The second phosphor, $YPO_4$:Ce, exhibits a bimodal emission spectrum with local peaks at 338 and 356 nm. The third phosphor, $BaSi_2O_5$:Pb, has an emission spectrum that peaks at 351 nm. As described previously, the $BaSi_2O_5$:Pb phosphor is the phosphor of choice in current state-of-the-art RTL applications. For example, all of the lamps shown in FIG. 1 use this phosphor at 100%. Although not required for this invention, it is preferred that an alumina coating be applied to the $BaSi_2O_5$:Pb phosphor.

The UV-emitting blend may additionally contain an amount of a UVB-emitting phosphor, preferably $SrCe_{0.08}MgAl_{11}O_{18}$ which emits in the UVB region at 310.5 nm. The amount of the UVB-emitting phosphor may range from 0–12 weight percent (wt. %) based on the combined weight of the UVA-emitting phosphors in the blend. Examples of other UVB-emitting phosphors include Ce(Sr, Mg)$Al_{11}O_{19}$:Ce, Ce(Ca,Mg)$A_{11}O_{19}$:Ce, Ce(Ba,Mg)$A_{11}O_{19}$:Ce and $LaPO_4$:Ce. In addition, it is conceivable to provide a UVB emission by altering the composition of one of the UVA-emitting phosphors. For example, an amount of lanthanum could be substituted for some of the yttrium in the formulation for $YPO_4$:Ce in order to give the phosphor a UVB emission in addition to its UVA emission.

In a first alternate embodiment, the UV-emitting phosphor blend of this invention comprises a mixture of $BaSi_2O_5$:Pb and at least one phosphor selected from $SrB_4O_7$:Eu and $YPO_4$:Ce. The relative proportions of the phosphors in the mixture range from 0 to 50 wt. % $SrB_4O_7$:Eu, 0 to 40 wt. % $YPO_4$:Ce, and 30 to 70 wt. % $BaSi_2O_5$:Pb wherein the sum of the weight percentages equals 100%. Preferably, the relative proportions of the UVA-emitting phosphors in the mixture range from 30 to 40 wt. % $SrB_4O_7$:Eu, 30 to 40 wt. % $YPO_4$:Ce, and 30 to 40 wt. % $BaSi_2O_5$:Pb. More preferably, the proportions range from 30 to 35 wt. % $SrB_4O_7$:Eu, 30 to 35 wt. % $YPO_4$:Ce, and 30 to 35 wt. % $BaSi_2O_5$:Pb. And most preferably, the proportions of the mixture are about 33.3 wt. % $SrB_4O_7$:Eu, about 33.3 wt. % $YPO_4$:Ce, and about 33.3 wt. % $BaSi_2O_5$:Pb. In each of the above cases, the UV-emitting phosphor blend may additionally contain an optional amount of a UVB-emitting phosphor in an amount from 0 to 12 wt. % of the mixture of UVA-emitting phosphors.

In a second alternate embodiment, the UV-emitting phosphor blend comprises a mixture of $BaSi_2O_5$:Pb and at least one phosphor selected from $SrB_4O_7$:Eu and $YPO_4$:Ce, wherein the relative proportions of the mixture range from 0 to 20 wt. % $SrB_4O_7$:Eu, 0 to 20 wt. % $YPO_4$:Ce, and 50 to 70 wt. % $BaSi_2O_5$:Pb and the sum of the weight percentages of the phosphors in the mixture equals 100%. Preferably, the relative proportions of the UVA-emitting phosphors range from 15 to 20 wt. % $SrB_4O_7$:Eu, 15 to 20 wt. % $YPO_4$:Ce, and 65 to 70 wt. % $BaSi_2O_5$:Pb. More preferably, the proportions are about 16.7 wt. % $SrB_4O_7$:Eu, about 16.7 wt. % $YPO_4$:Ce, and about 66.6 wt. % $BaSi_2O_5$:Pb. Again, in each instance, the UV-emitting phosphor blend may additionally contain a UVB-emitting phosphor in an amount from 0 to 12 wt. % of the mixture of UVA-emitting phosphors.

In a third alternate embodiment, the UV-emitting phosphor blend comprises a mixture of $BaSi_2O_5$:Pb and $SrB_4O_7$:Eu, wherein the relative proportions range from 40 to 60 wt. % $SrB_4O_7$:Eu and 40 to 60 wt. % $BaSi_2O_5$:Pb and the sum of their weight percentages equals 100%. Preferably, the relative proportions range from 45 to 55 wt. % $SrB_4O_7$:Eu and 45 to 55 wt. % $BaSi_2O_5$:Pb. More preferably, the mixture comprises about 50% wt. % $SrB_4O_7$:Eu and about 50 wt. % $BaSi_2O_5$:Pb. As above, the phosphor blend may additionally contain a UVB-emitting phosphor in an amount from 0 to 12 wt. % of the mixture of UVA-emitting phosphors.

In a fourth alternate embodiment, the UV-emitting phosphor blend comprises a mixture of $YPO_4$:Ce and $SrB_4O_7$:Eu, wherein the relative proportions of the phosphors range from 40 to 60 wt. % $SrB_4O_7$:Eu and 40 to 60 wt. % $YPO_4$:Ce and the sum of their weight percentages equals 100%. Preferably, this mixture comprises 45 to 55 wt. % $SrB_4O_7$:Eu and 45 to 55 wt. % $YPO_4$:Ce. More preferably, the mixture comprises about 50% wt. % $SrB_4O_7$:Eu and about 50 wt. % $YPO_4$:Ce. As above, the phosphor blend may additionally contain a UVB-emitting phosphor in an amount from 0 to 12 wt. % of the mixture of UVA-emitting phosphors.

The following nonlimiting examples are presented.

EXAMPLES 1–10

A number of reflector tanning lamps were made which contained various combinations of the four UV-emitting phosphors used in the UV-emitting blends of this invention. All the four UV-emitting phosphors were manufactured by OSRAM SYLVANIA Products Inc., Towanda, Pa. $SrB_4O_7$:Eu is designated as OSRAM SYLVANIA Type 2052, $BaSi_2O_5$:Pb (coated with $Al_2O_3$) as OSRAM SYLVANIA Type GS2016, $YPO_4$:Ce as OSRAM SYLVANIA Type 2040, and $SrCe_{0.08}MgAl_{11}O_{18}$ as OSRAM SYLVANIA Type 2096. The physical properties of the phosphors are given in Table 1. Particle size distribution was measured by a Coulter LS130 laser diffraction system.

TABLE 1

| Phosphor | 50% Size (μm) | BET Surface Area (m²/g) | Density (g/cm³) |
|---|---|---|---|
| $SrB_4O_7$:Eu | 9.9 | 0.61 | 3.4 |
| $YPO_4$:Ce | 13.5 | 0.69 | 4.24 |
| $BaSi_2O_5$:Pb | 11.2 | 0.65 | 3.9 |
| $SrCe_{0.08}MgAl_{11}O_{18}$ | 12.9 | 0.91 | 3.5 |

The effect of the blend composition on the 0 h UVA output and 100 h UVA maintenance of the lamps may be demonstrated with a Simplex-Centroid design. In particular, the blend composition was varied such that the sum of the mass fractions of the three UVA-emitting phosphors, $SrB_4O_7$:Eu, $YPO_4$:Ce and $BaSi_2O_5$:Pb, added up to unity. The Simplex-Centroid design for the three UVA-emitting phosphors results in a total of ten blends for which the relative amounts of each phosphor are given in Table 2. Each of these ten blends also contained a fixed amount of the UVB-emitting phosphor, $SrCe_{0.08}MgAl_{11}O_{18}$, which was 4 wt. % of the mixture of UVA-emitting phosphors. Blend 11 was used as a separate control and contained only the $BaSi_2O_5$:Pb phosphor.

TABLE 2

| Blend/Group | $SrB_4O_7$:Eu | $YPO_4$:Ce | $BaSi_2O_5$:Pb |
|---|---|---|---|
| 1 | 1 | 0 | 0 |
| 2 | 0 | 1 | 0 |
| 3 | 0 | 0 | 1 |
| 4 | 0.5 | 0.5 | 0 |
| 5 | 0.5 | 0 | 0.5 |
| 6 | 0 | 0.5 | 0.5 |
| 7 | 0.3333 | 0.3333 | 0.3333 |
| 8 | 0.6667 | 0.1667 | 0.1667 |
| 9 | 0.1667 | 0.6667 | 0.1667 |
| 10 | 0.1667 | 0.1667 | 0.6667 |
| 11 (Control) | 0 | 0 | 1 |

Figure 2:
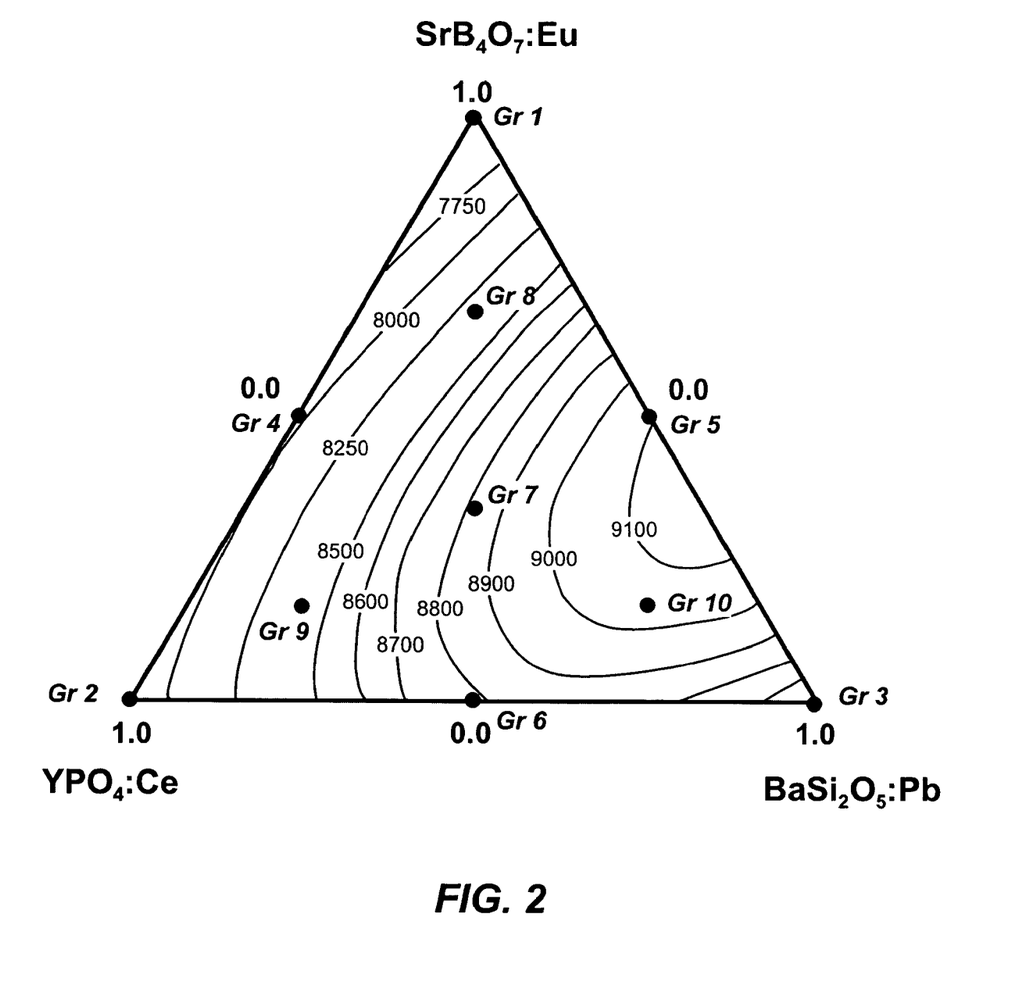
FIG. 2 is a contour plot of the 0 h UVA output of several groups of tanning lamps containing various UV-emitting phosphor blends.
Figure 3:
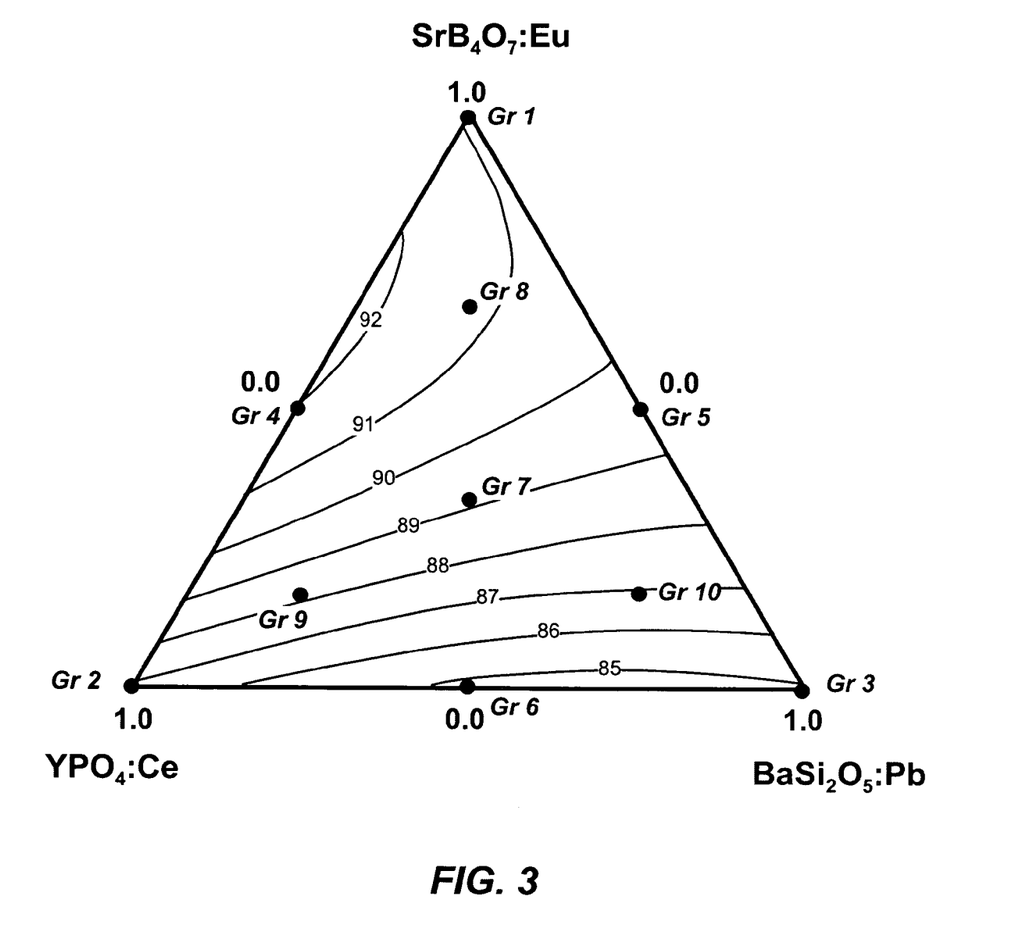
FIG. 3 is a contour plot of the 100 h UVA maintenance of several groups of tanning lamps containing various UV-emitting phosphor blends.
Figure 4:
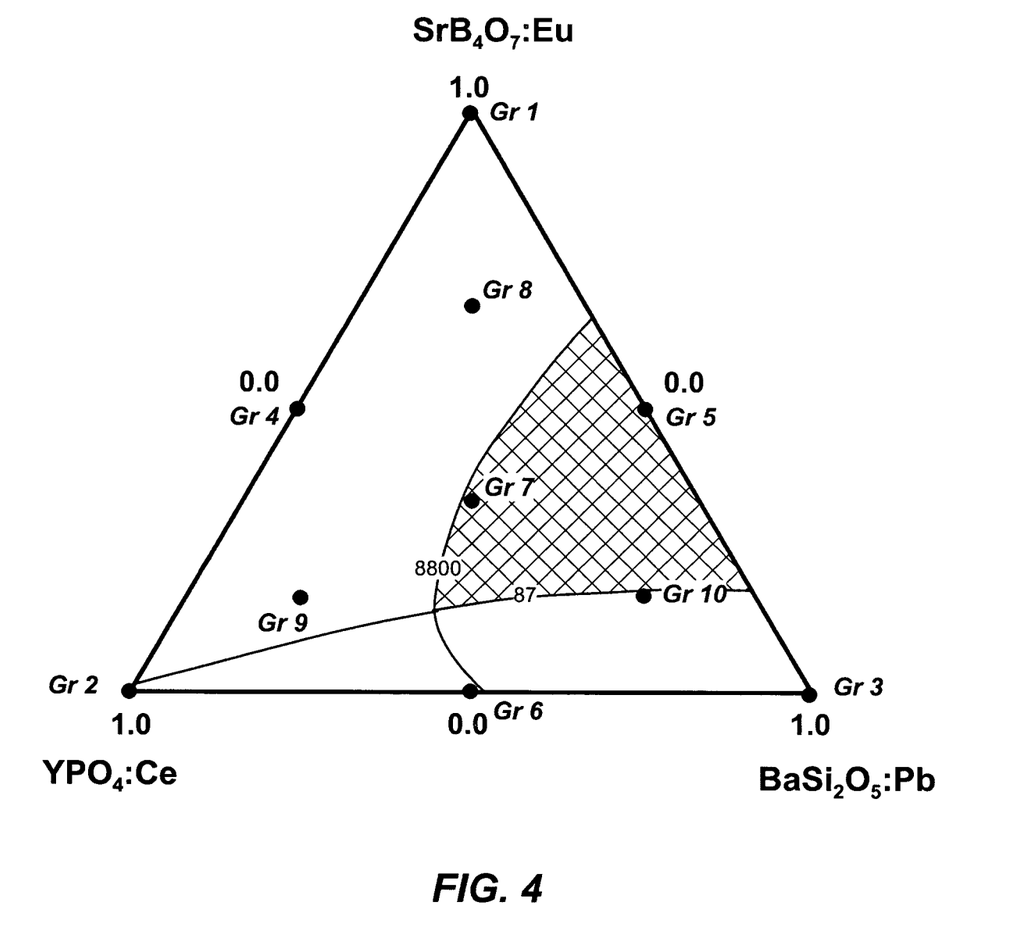
FIG. 4 is a graphical illustration of the preferred UV-emitting blend compositions of the present invention.

These blends are represented in the triangular composition diagrams shown in FIGS. 2–4. Blends 1–3 (Gr 1–3) occupy the vertices of the ternary diagrams. Blends 4 to 6 (Gr 4–6) occupy the mid-points of the three sides of the triangles. For example, blend 5 contains a 50:50 mixture of $SrB_4O_7$:Eu and $BaSi_2O_5$:Pb and is located exactly halfway between the vertices representing $SrB_4O_7$:Eu and $BaSi_2O_5$:Pb. Blends 7 to 10 (Gr 7–10) contain mixtures of $SrB_4O_7$:Eu, $YPO_4$:Ce and $BaSi_2O_5$:Pb. In particular, blend 7 is the centroid which is located at the point of intersection of the medians of the triangle. At the centroid, each of the three phosphors is a third of the mixture. Blends 8 to 10 are called axial points and are located on the median lines of the triangle such that one of the components is ⅔ of the mixture while the other two are a sixth each. It is important to remember that each of the ten blends contains 4 wt. % $SrCe_{0.08}MgAl_{11}O_{18}$ wherein the weight percentage is calculated based on the combined weight of the mixture of UVA-emitting phosphors.

Coating Suspensions and Bulb Coating

Organic-based coating suspensions were made using conventional suspension components. These included, in addition to the phosphor blend, a solvent, a polymeric binder, a dispersing agent, a plasticizer and adherence agents. A preferred suspension includes xylene as the solvent, ethyl cellulose as the binder, and benzoic acid and Armeen CD, a primary amine made by Akzo Nobel Chemicals, as the dispersing agent combination. In addition, dibutyl phthalate is a common plasticizer and finely divided aluminum oxide (Aluminum Oxide C from Degussa AG) serves as a good adherence agent.

Standard six-foot T12 (1.5 in. O.D.) bulbs with a pre-coated alumina reflector covering about 220° of the circumference were used. The phosphor suspension was manually applied over the interior surface using a combination of axial and rotational motions. The coated bulb was then allowed to drain and dry for about 30 minutes yielding a phosphor coating having a total loading of about 8.5 g of phosphor.

Lamp Finishing

The lamps were then loaded into a baker where the residual organic components in the coating were combusted in the presence of air. Electrode mounts were sealed into each end of the baked bulbs. The lamps were then preheated and exhausted through exhaust tubes in the electrode mounts. Mercury and a fill gas were introduced into the lamps and the exhaust tubes were sealed. The fill pressure was 1.8 torr for the ten test groups and 2.7 torr for the control group. The fill gas in all cases was a 70/30 neon-argon mixture. Mercury dosing was 18 mg. Conventional lamp bases were there attached to the lamps. The wattages of the test groups ranged from a low of 167.3 W to a high of 170.2 W whereas the control group wattage was 170.9 W.

Figure 5:
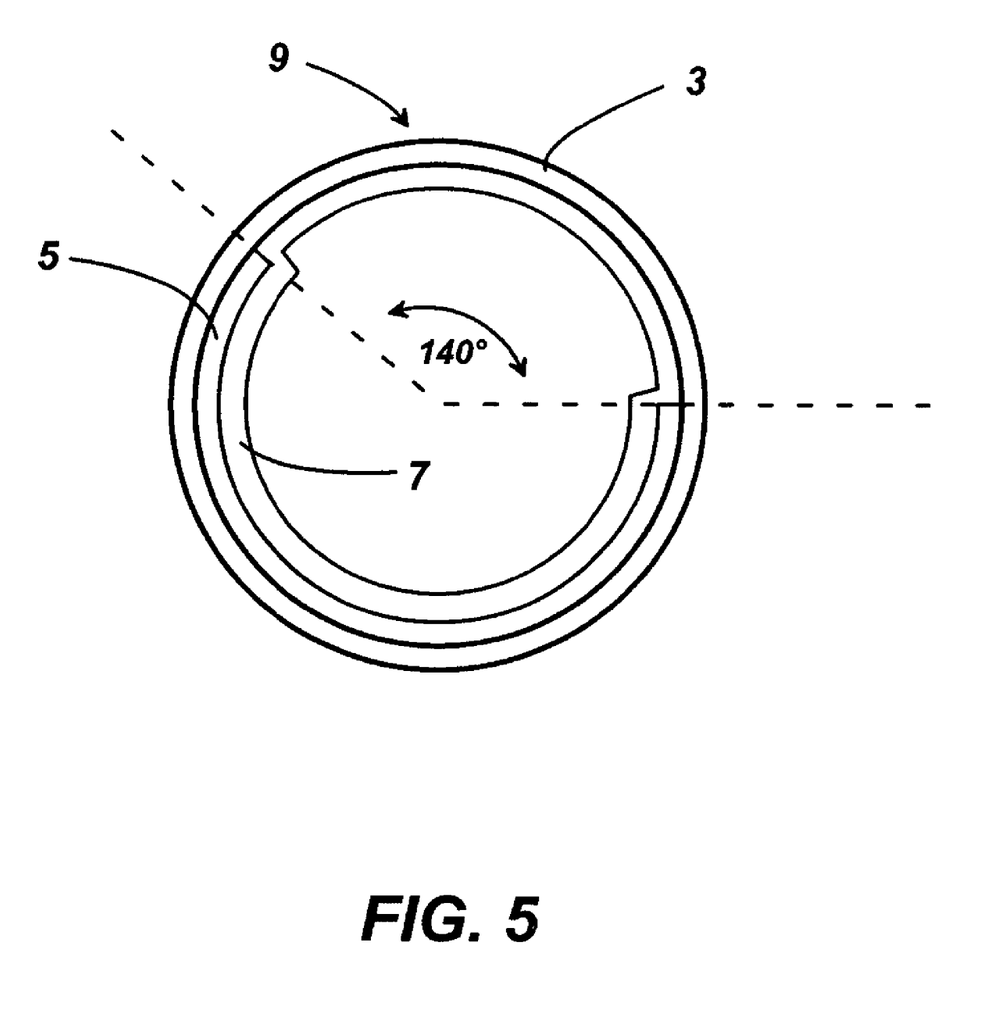
FIG. 5 is a cross-sectional illustration of a reflector tanning lamp.

A cross-sectional illustration of a finished reflector lamp is shown in FIG. 5. The lamp UV-transmissive envelope 3 has a partial alumina reflector coating 5 which extends over about 220° of the circumference. The phosphor coating 7 is disposed on top of the reflector coating 5 and extends over the entire circumference of the envelope 3 including the 140° segment 9 where there is no reflector coating.

Several lamps were made with each phosphor blend. The UV output of each group of test lamps was corrected for the difference in wattages between the test group and the control group. This was done by (1) computing the UV output per watt for each test group, (2) multiplying that value by the wattage differential between each test group and the control group 11, and (3) adding the result to the original UV flux value for the test group. A second correction factor was then applied to account for differences between the experimental measurement setup used for these lamps and a typical measurement setup used for commercial lamps. One of the reasons for the different experimental setup used here was that the UV output from some of lamps was too high to permit the measurement to be made at the normal 10 cm distance from the lamp centerline. A second reason was that a different lamp stabilization method was adopted for these tests that increased the signal-to-noise ratio of the photometric measurement.

After determining the initial UVA output, five lamps per group were aged to 100 h and then the UVA output was measured again. The 100 h VA maintenance was then computed for each of the lamps in all groups. As described previously, the 100 h UVA maintenance is defined as the ratio of 100 h UVA output to 0 h UVA output with the ratio being multiplied by 100 to express it as a percentage. The 100 h maintenance of each group was then adjusted by normalizing the maintenance of the control group to 85% which is typical for this lamp. The mean 0 h UVA output and 100 h UVA maintenance of the groups is shown in Table 3.

TABLE 3

| Group/Blend | Corrected 0 h UVA Output ($\mu W/cm^2$) | Normalized 100 h UVA Maintenance (%) |
|---|---|---|
| 1 | 7364 | 91.3 |
| 2 | 7816 | 87.1 |
| 3 | 8641 | 84.7 |
| 4 | 7887 | 92.3 |
| 5 | 9099 | 89.6 |
| 6 | 8790 | 84.5 |
| 7 | 8816 | 90.5 |
| 8 | 8409 | 89.7 |
| 9 | 8525 | 87.8 |
| 10 | 8896 | 87.2 |
| 11 (Control) | 8388 | 85.0 |

From the data in Table 3, it is possible to construct contour diagrams in the triangular composition space. Referring to FIG. 2, there is shown a contour plot for the 0 h UVA output. Each contour line connects those compositions which have the same 0 h UVA output. The 0 h UVA output associated with each contour line is given in $\mu W/cm^2$.

It is apparent that a higher 0 h UVA output is favored by compositions that lie closer to the $SrB_4O_7$:Eu—$BaSi_2O_5$:Pb binary line. The blends having the three highest 0 h UVA outputs in the Simplex-Centroid design were blends 5, 10 and 7 with 0 h UVA outputs of 9100, 8896 and 8816 $\mu W/cm^2$ respectively. These outputs exceed the 0 h UVA output of the control group 11 by 8.5%, 6%, and 5.1%, respectively. These increases are greater than the approximate 3% increase which is attributable to the lower fill pressure of the test lamps. The increase in the 0 h UVA output caused by the lower fill pressure alone can be seen by comparing the 0 h UVA outputs of groups 3 and 11.

Blend 5 contains no $YPO_4$:Ce and its 0 h UVA output greatly exceeds the mean 0 h UVA output of blends 1 and 3 which represent single-component mixtures of each phosphor in blend 5. This indicates that there is a synergism between the $SrB_4O_7$:Eu and $BaSi_2O_5$:Pb components which cannot be attributed to wattage or powder weight issues. While not wishing to be bound by theory, a possible explanation for the synergy between the $SrB_4O_7$:Eu and $BaSi_2O_5$:Pb phosphors may be deduced from the observed overlap between the emission spectrum of the $BaSi_2O_5$:Pb phosphor and the excitation spectrum of the $SrB_4O_7$:Eu phosphor. The excitation spectrum for $SrB_4O_7$:Eu extends up to about 360 nm and the broad emission from $BaSi_2O_5$:Pb peaks at about 350 nm. This means that a portion of the emission from the $BaSi_2O_5$:Pb phosphor excites the $SrB_4O_7$:Eu phosphor which then remits according to its characteristic emission spectrum which peaks at 368 nm. The overlap of the excitation and emission spectra coupled with quantum efficiency considerations of individual phosphor components may explain the significant synergy identified for the $SrB_4O_7$:Eu—$BaSi_2O_5$:Pb system.

A similar contour plot was constructed for the 100 h UVA maintenance. Referring to FIG. 3, the contour lines define the range of compositions having the same 100 h UVA maintenance value. The maintenance value associated with each contour line is given in terms of %. The plot shows that higher 100 h UVA maintenance values are favored by blend compositions that lie closer to the $SrB_4O_7$:Eu—$YPO_4$:Ce composition line. The highest 100 h UVA maintenance is observed with blend 4 which contains equal amounts of $SrB_4O_7$:Eu and $YPO_4$:Ce The plot shows that increasing the amount of $BaSi_2O_5$:Pb phosphor in the blend lowers the 100 h UVA maintenance.

From FIGS. 2 and 3, it is clear that the blend composition space that favors a high 0 h UVA output is different from the space that is optimal for high 100 h UVA maintenance. Therefore, there must be a joint optimization of the two responses. This was done with the help of an overlaid contour plot, FIG. 4, wherein the lower boundary for the 0 h UVA response was specified at about 8800 $\mu W/cm^2$ and lower boundary for the 100 h UVA maintenance response was specified at about 87%. The cross-hatched region in FIG. 4 is where the two responses overlap. This region represents those blend compositions that result in simultaneous high values of 0 h UVA output and 100 h UVA maintenance. It can be seen that the blends 5, 7 and 10 fall within this region.

The performance of these three blends can be put in perspective when they are compared with the current state of the art represented by control group 11. The lamps in the control group exhibit a 0 h UVA output of 8388 $\mu W/cm^2$ and a 100 h UVA maintenance of 85%. The lamps in group 5 exhibit a 0 h UVA output of 9099 $\mu W/cm^2$ and a 100 h UVA maintenance of 89.6%. This represents a gain of 8.5% in 0 h UVA output and an increase of almost 5 percentage points in 100 h UVA maintenance. Similarly, the lamps in groups 7 and 10 represent a gain of about 5–6% in 0 h UVA output and an increase of about 2 to more than 4 percentage points in 100 h UVA maintenance. As discussed previously, these gains in 0 h output are greater than the 3% increase attributable to the lower fill pressure of the test lamps. Thus, the UV-emitting blends of this invention have been shown to exhibit higher 0 h UVA outputs at high 100 h UVA maintenance values.

It is also worth noting at this point that blend 4 which has a lower 0 h UVA output than the control group is nevertheless commercially important because of its very high 100 h UVA maintenance. Even though the 0 h UVA output of blend 4 is 7887 $\mu W/cm^2$ compared to 8388 $\mu W/cm^2$ for the control, the much higher 100 h UVA maintenance of 92.3% for blend 4 means that at 100 hours the UVA output of blend 4 (7280 $\mu W/cm^2$) exceeds that of the control (7130 $\mu W/cm^2$). Therefore, blend 4 would be very desirable for applications in which a very high maintenance is needed.

Spectral Power Distribution

Figure 6:
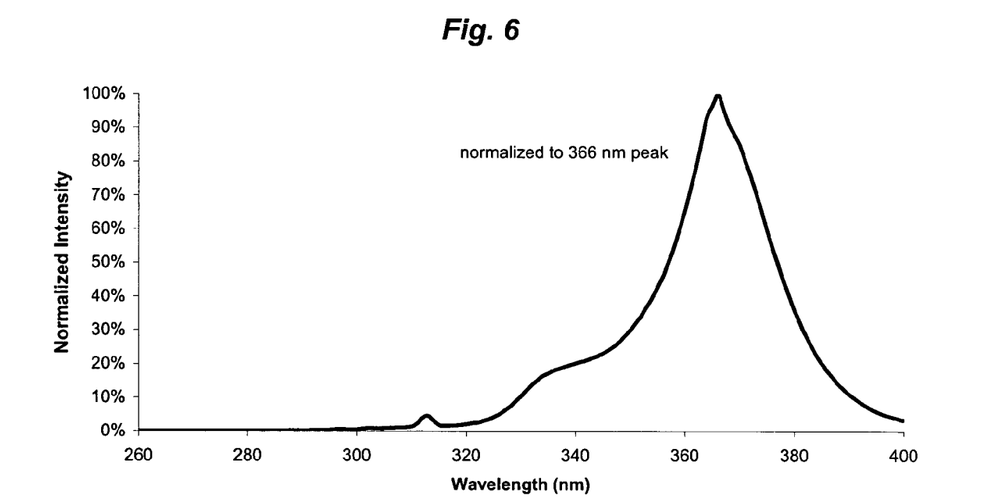
FIG. 6 is a graphical representation of the normalized spectral power distribution of a fluorescent tanning lamp according to the present invention.

The spectral power distribution (SPD) of a tanning lamp according to this invention is shown in FIG. 6. The SPD is represented as a function of the normalized intensity in the wavelength range from 260 nm to 400 nm. In this case, the SPD was normalized to 100% at 366 nm, the peak UVA emission. The SPD of a preferred embodiment of this invention is given in Table 4 in terms of a range of normalized intensities over a defined wavelength interval. As with FIG. 6, the intensities are normalized to the most intense UVA emission in the SPD, which in this case occurs at about 366 nm.

TABLE 4

| Wavelength Range (nm) | Range of Normalized Intensity (%) |
|---|---|
| 280–283 | 0.01–0.03 |
| 284–290 | 0.03–0.15 |
| 291–297 | 0.15–0.6 |

TABLE 4-continued

| Wavelength Range (nm) | Range of Normalized Intensity (%) |
|---|---|
| 298–306 | 0.5–1 |
| 307–311 | 1–3 |
| 312–314 | 3–5 |
| 315–326 | 1–5 |
| 327–335 | 6–18 |
| 336–340 | 18–20 |
| 341–352 | 20–35 |
| 353–360 | 36–66 |
| 361–366 | 71–100 |
| 367–372 | 96–75 |
| 373–377 | 71–49 |
| 378–381 | 45–32 |
| 382–388 | 29–13 |
| 389–400 | 13–3 |

Figure 7:
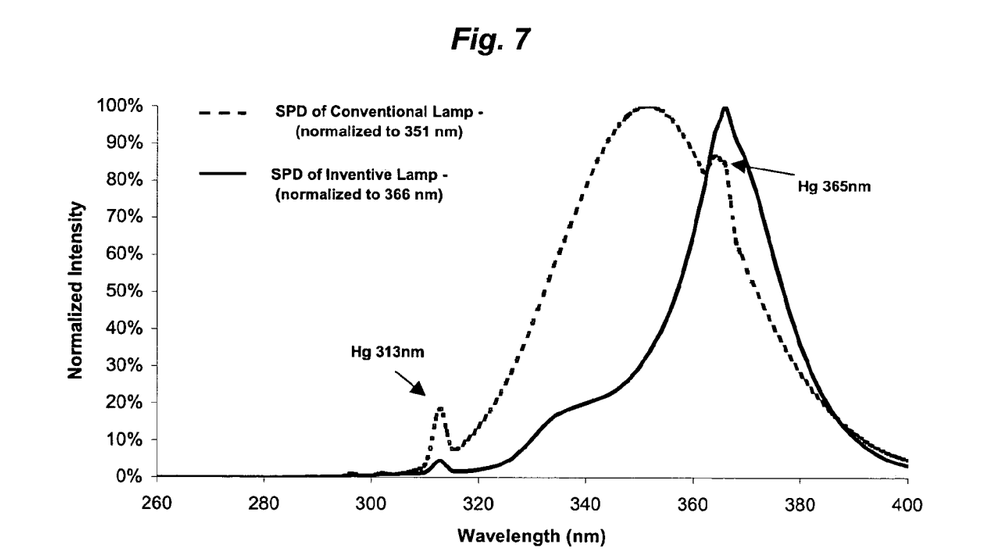
FIG. 7 is a comparison of the normalized spectral power distributions of a conventional fluorescent tanning lamp and a fluorescent tanning lamp according to the present invention.

Referring now to FIG. 7, it can be seen that the SPD of the inventive lamp is significantly different than the SPD of a conventional fluorescent tanning lamp which contains only a $BaSi_2O_5$:Pb phosphor (normalized to 100% at 351 nm). The SPD of the inventive lamp has a peak UVA emission at 366 nm whereas the conventional lamp has a peak emission at 351 nm. The width of the UVA emission is also only about ½ the width of the UVA emission of the conventional lamp. The full width at half maximum (FWHM) for the UVA emission peak of the inventive lamp is about 20 nm compared to 40 nm for the conventional lamp.

Figure 8:
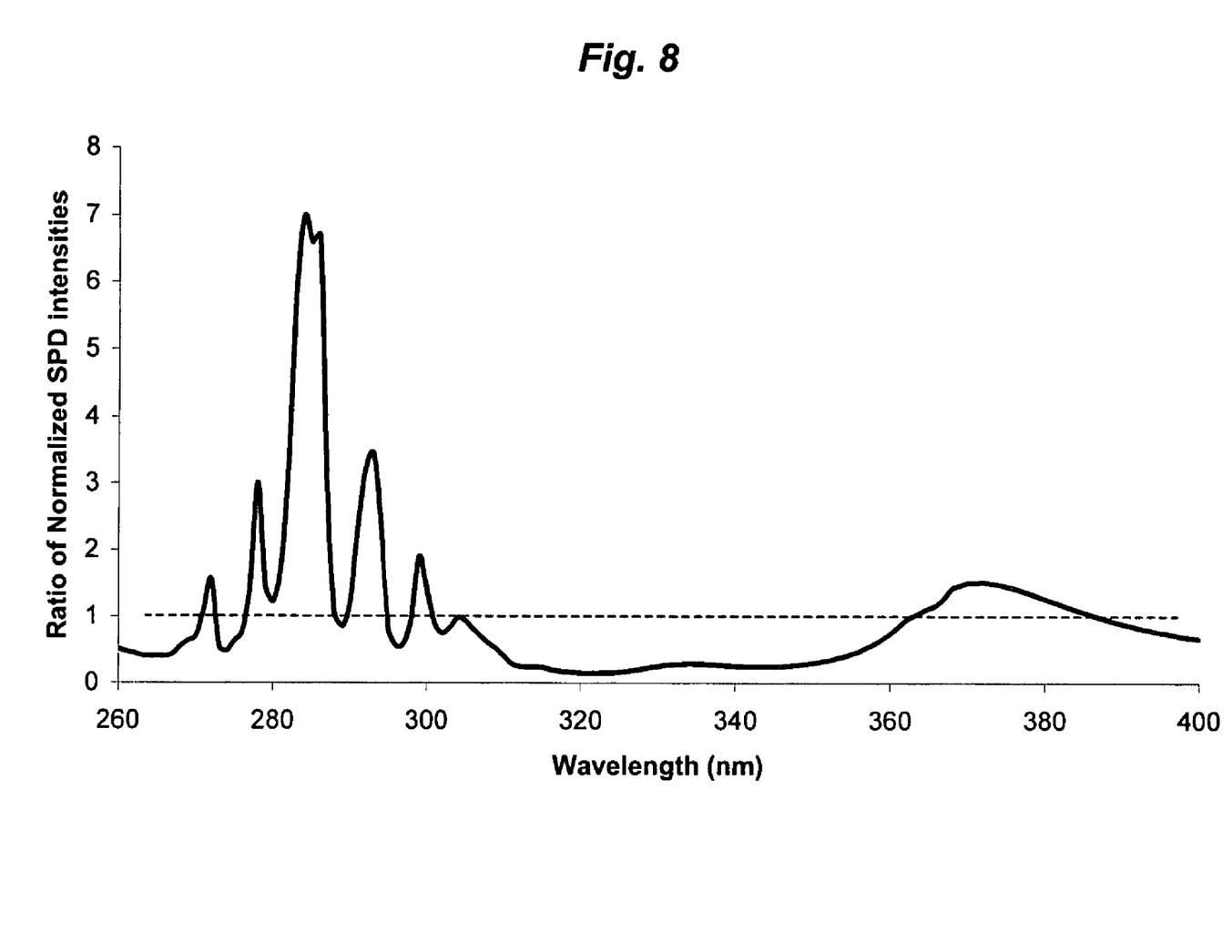
FIG. 8 is a ratio of a normalized spectral power distribution of a fluorescent tanning lamp according to the present invention to a normalized spectral power distribution of a conventional fluorescent tanning lamp.

FIG. 8 also shows that there are significant differences in the UVB emissions of the two lamps. In this case, the normalized SPD for the inventive lamp is divided by the normalized SPD of the conventional lamp to form a ratio of the intensities. The dashed line represents a ratio of 1:1 for the normalized intensities of the two lamps. Ratio values greater than 1:1 indicate a greater normalized intensity for the inventive lamp at that particular wavelength. For the majority of wavelengths in the UVB region between 260 nm and 320 nm, the normalized intensity of the inventive lamp is shown to be greater than that of the conventional lamp.

EXAMPLES 12–14

Additional fluorescent tanning lamps according to this invention were fabricated as described previously using a preferred UV-emitting blend having the composition shown in Table 5 below. The weight percentages of the phosphors in Table 5 are given as a percentage of the weight of the entire blend.

TABLE 5

| Phosphor | wt. % in Blend |
|---|---|
| alumina-coated $BaSi_2O_5$:Pb (OSRAM SYLVANIA Type GS201X) | 62.3 |
| $YPO_4$:Ce (OSRAM SYLVANIA Type 2040) | 15.6 |
| $SrB_4O_7$:Eu (OSRAM SYLVANIA Type 2052) | 15.6 |
| $SrCe_{0.08}MgAl_{11}O_{18}$ (OSRAM SYLVANIA Type 2096) | 6.5 |

The weight ratio of the UVA-emitting phosphors $BaSi_2O_5$:Pb, $YPO_4$:Ce, and $SrB_4O_7$:Eu is 0.667:0.167:0.167 which is similar to the ratio in Blend 10 described above. However, the proportion of the UVB-emitting phosphor, $SrCe_{0.08}MgAl_{11}O_{18}$, is higher in this blend. In Blend 10, the amount of the UVB-emitting phosphor was equal to 4 percent of the combined weight of the UVA-emitting phosphors. In these Examples, the amount of the UVB-emitting phosphor is almost 7 percent of the combined weight of the UVA-emitting phosphors (100%*6.5/(62.3+15.6+15.6)).

The lamps were evaluated for both UVA and UVB output as well as UVA and UVB maintenance. The UVB measurements were made similarly to the UVA measurements described above. The performance of the lamps is given in Table 6. Control lamps were also fabricated using only the alumina-coated $BaSi_2O_5$:Pb (GS201X) phosphor.

TABLE 6

| Lamp Type | 0 h UVA Output, ($\mu W/cm^2$) | 100 h UVA maintenance (%) | 100 h UVB maintenance (%) |
|---|---|---|---|
| FR70.2T12/VHR/HP | 8917 | 91.9 | 92.6 |
| Control | 8558 | 87.3 | 83 |
| FR75T12/VHR/HP | 8327 | 94.4 | 95 |
| Control | 7679 | 84.1 | 79.5 |
| FR75T12/VHR/HP | 8341 | 90.6 | 90.8 |
| Control | 7689 | 80.8 | 76.9 |

The lower 0 h UVA output of the FR75T12 lamp types is believed to be associated with their longer length. However, their 0 h UVA outputs were still better than the corresponding control lamps by about 8%. With all three lamps, both the 100 h UVA and 100 h UVB maintenance values were at least about 90% which was significantly better than corresponding maintenance values for the control lamps.

While there has been shown and described what are at the present considered the preferred embodiments of the invention, it will be obvious to those skilled in the art that various changes and modifications may be made therein without departing from the scope of the invention as defined by the appended claims.

We claim:

1. A UV-emitting phosphor blend comprising a mixture of at least two UVA-emitting phosphors selected from $SrB_4O_7$:Eu, $YPO_4$:Ce, and $BaSi_2O_5$:Pb, the mixture of UVA-emitting phosphors comprising 0 to 50 wt. % $SrB_4O_7$:Eu, 0 to 40 wt. % $YPO_4$:Ce, and 30 to 70 wt. % $BaSi_2O_5$:Pb, the sum of the weight percentages of the phosphors in the mixture equaling 100%, the phosphor blend additionally containing an optional amount of a UVB-emitting phosphor having a range from 0 to 12 wt. % of the mixture.

2. The phosphor blend of claim 1 wherein the mixture of UVA-emitting phosphors comprises 30 to 40 wt. % $SrB_4O_7$:Eu, 30 to 40 wt. % $YPO_4$:Ce, and 30 to 40 wt. % $BaSi_2O_5$:Pb.

3. The phosphor blend of claim 1 wherein the mixture of UVA-emitting phosphors comprises 30 to 35 wt. % $SrB_4O_7$:Eu, 30 to 35 wt. % $YPO_4$:Ce, and 30 to 35 wt. % $BaSi_2O_5$:Pb.

4. The phosphor blend of claim 1 wherein the mixture of UVA-emitting phosphors comprises about 33.3 wt. % $SrB_4O_7$:Eu, about 33.3 wt. % $YPO_4$:Ce, and about 33.3 wt. % $BaSi_2O_5$:Pb.

5. The phosphor blend of claim 1 wherein the mixture of UVA-emitting phosphors comprises 0 to 20 wt. % $SrB_4O_7$:Eu, 0 to 20 wt. % $YPO_4$:Ce, and 50 to 70 wt. % $BaSi_2O_5$:Pb.

6. The phosphor blend of claim 1 wherein the mixture of UVA-emitting phosphors comprises 15 to 20 wt. % $SrB_4O_7$:Eu, 15 to 20 wt. % $YPO_4$:Ce, and 65 to 70 wt. % $BaSi_2O_5$:Pb.

7. The phosphor blend of claim 1 wherein the mixture of UVA-emitting phosphors comprises about 16.7 wt. % $SrB_4O_7$:Eu, about 16.7 wt. % $YPO_4$:Ce, and about 66.6 wt. % $BaSi_2O_5$:Pb.

8. The phosphor blend of claim 1 wherein the UVB-emitting phosphor is selected from $Ce(Sr,Mg)Al_{11}O_{19}$:Ce, $Ce(Ca,Mg)A_{11}O_{19}$:Ce, $Ce(Ba,Mg)A_{11}O_{19}$:Ce or $LaPO_4$:Ce.

9. A UV-emitting phosphor blend comprising a mixture of 45 to 55 wt. % $SrB_4O_7$:Eu and 45 to 55 wt. % $BaSi_2O_5$:Pb wherein the sum of the weight percentages of the phosphors in the mixture equals 100%, the phosphor blend additionally containing an optional amount of a UVB-emitting phosphor having a range from 0 to 12 wt. % of the mixture.

10. The phosphor blend of claim 9 wherein the mixture of UVA-emitting phosphors comprises about 50 wt. % $SrB_4O_7$: Eu and about 50 wt. % $BaSi_2O_5$:Pb.

11. A UV-emitting phosphor blend comprising a mixture of 40 to 60 wt. % $SrB_4O_7$:Eu and 40 to 60 wt. % $YPO_4$:Ce wherein the sum of the weight percentages of the phosphors in the mixture equals 100%, the phosphor blend additionally containing an optional amount of a UVB-emitting phosphor having a range from 0 to 12 wt. % of the mixture.

12. The phosphor blend of claim 11 wherein the mixture of UVA-emitting phosphors comprises 45 to 55 wt. % $SrB_4O_7$:Eu and 45 to 55 wt. % $YPO_4$:Ce.

13. The phosphor blend of claim 11 wherein the mixture of UVA-emitting phosphors comprises about 50 wt. % $SrB_4O_7$:Eu and about 50 wt. % $YPO_4$:Ce.

14. A fluorescent tanning lamp having a UV-transmissive envelope and a phosphor coating on an inner wall of the envelope, the phosphor coating containing a UV-emitting phosphor blend comprising a mixture of at least two UVA-emitting phosphors selected from $SrB_4O_7$:Eu, $YPO_4$:Ce, and $BaSi_2O_5$:Pb, the phosphor blend additionally containing an optional amount of a UVB-emitting phosphor having a range from 0 to 12 wt. % of the mixture, wherein the lamp exhibits a 100 h UVA maintenance of at least about 87%.

15. The fluorescent lamp of claim 14 wherein the lamp exhibits a 0h UVA output of at least about 8800 µW/cm².

16. The fluorescent lamp of claim 15 wherein the mixture of UVA-emitting phosphors comprises 0 to 50 wt. % $SrB_4O_7$:Eu, 0 to 40 wt. % $YPO_4$:Ce, and 30 to 70 wt. % $BaSi_2O_5$:Pb.

17. The fluorescent lamp of claim 15 wherein the mixture of UVA-emitting phosphors comprises 0 to 20 wt. % $SrB_4O_7$:Eu, 0 to 20 wt. % $YPO_4$:Ce, and 50 to 70 wt. % $BaSi_2O_5$:Pb.

18. The fluorescent lamp of claim 15 wherein the mixture of UVA-emitting phosphors comprises 40 to 60 wt. % $SrB_4O_7$:Eu and 40 to 60 wt. % $BaSi_2O_5$:Pb.

19. The fluorescent lamp of claim 15 wherein the envelope is tubular and further contains a reflector layer extending over a 22020 segment of the circumference of the envelope, the reflector layer being disposed between the envelope and the phosphor layer, the phosphor layer extending over the entire circumference of the envelope.

20. The fluorescent lamp of claim 14 wherein the mixture of UVA-emitting phosphors comprises 40 to 60 wt. % $SrB_4O_7$:Eu and 40 to 60 wt. % $YPO_4$:Ce.

21. The fluorescent lamp of claim 14 wherein the lamp exhibits a 100 h UVA maintenance of at least about 90%.

22. The fluorescent lamp of claim 14 wherein the UVB-emitting phosphor is selected from $Ce(Sr,Mg)Al_{11}O_{19}$:Ce, $Ce(Ca,Mg)A_{11}O_{19}$:Ce, $Ce(Ba,Mg)A_{11}O_{19}$:Ce or $LaPO_4$:Ce.

23. A fluorescent tanning lamp having a UV-transmissive envelope and a phosphor coating on an inner wall of the envelope, wherein the lamp exhibits a normalized spectral power distribution defined by:

| Wavelength Range (nm) | Normalized Intensity (%) |
| --- | --- |
| 280–283 | 0.01–0.02 |
| 284–290 | 0.03–0.15 |
| 291–297 | 0.15–0.6 |
| 298–306 | 0.5–1 |
| 307–311 | 1–2 |
| 312–314 | 3–5 |
| 315–326 | 1–5 |
| 327–335 | 6–17 |
| 336–340 | 18–20 |
| 341–352 | 20–35 |
| 353–360 | 36–66 |
| 361–366 | 71–100 |
| 367–372 | 96–75 |
| 373–377 | 71–49 |
| 378–381 | 45–32 |
| 382–388 | 29–13 |
| 389–400 | 13–3. |

24. The fluorescent lamp of claim 23 wherein the phosphor coating contains a UV-emitting phosphor blend comprising a mixture of at least two UVA-emitting phosphors selected from $SrB_4O_7$:Eu, $YPO_4$:Ce, and $BaSi_2O_5$:Pb, and the phosphor blend additionally contains an optional amount of a UVB-emitting phosphor having a range from 0 to 12 wt. % of the mixture.

25. A UV-emitting phosphor blend comprising 62.3 wt. % $BaSi_2O_5$:Pb, 15.6 wt. % $SrB_4O_7$:Eu, 15.6 wt. % $YPO_4$:Ce, and 6.5 wt. % $SrCe_{0.08}MgAl_{11}O_{18}$.

26. A fluorescent tanning lamp having a UV-transmissive envelope and a phosphor coating on an inner wall of the envelope, the phosphor coating containing a UV-emitting phosphor blend comprising 62.3 wt. % $BaSi_2O_5$:Pb, 15.6 wt. % $SrB_4O_7$:Eu, 15.6 wt. % $YPO_4$:Ce, and 6.5 wt. % $SrCe_{0.08}MgAl_{11}O_{18}$.

* * * * *